US010749428B1

(12) United States Patent
Sengodan (10) Patent No.: US 10,749,428 B1
(45) Date of Patent: Aug. 18, 2020

(54) DC TO DC CONVERTER WITH SEQUENTIALLY SWITCHED LC SNUBBER AND REGENERATIVE CIRCUIT

(71) Applicant: Hamilton Sundstrand Corporation, Charlotte, NC (US)

(72) Inventor: Rajkumar Sengodan, Tamilnadu (IN)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/444,158

(22) Filed: Jun. 18, 2019

(30) Foreign Application Priority Data

Apr. 22, 2019 (IN) .............................. 201911015926

(51) Int. Cl.
*H02M 1/34* (2007.01)
*H02M 3/158* (2006.01)
*H02M 1/00* (2006.01)

(52) U.S. Cl.
CPC ........... *H02M 1/34* (2013.01); *H02M 1/0061* (2013.01); *H02M 3/158* (2013.01); *H02M 2001/0003* (2013.01)

(58) Field of Classification Search
CPC ..... H02M 2001/342; H02M 2001/344; H02M 1/34
See application file for complete search history.

(56) References Cited

U.S. PATENT DOCUMENTS

| 6,317,341 B1* | 11/2001 | Fraidlin | H02M 1/4258 363/21.04 |
| 7,557,546 B2 | 7/2009 | Uruno et al. | |
| 2010/0246215 A1* | 9/2010 | Mase | H02M 1/36 363/21.04 |
| 2018/0269793 A1* | 9/2018 | Ahsanuzzaman | H02M 3/33523 |

* cited by examiner

*Primary Examiner* — Matthew V Nguyen
*Assistant Examiner* — Jye-June Lee
(74) *Attorney, Agent, or Firm* — Cantor Colburn LLP (57) ABSTRACT

A switched mode power supply (SMPS) having a DC bus supplied by an power input, a first transformer with a first primary connected to the DC bus, and a second transformer with a second primary connected in series with the first primary, a first switching device connected in parallel with the second primary, a second switching device connected in series between the first switching device and a circuit ground. The SMPS also includes a snubber and hold up circuit having a diode and a holdup capacitor connected in parallel with the second switching device. The SMPS also includes a first control circuit connected to the first switching device and a second control circuit connected to the second switching device, wherein the output of the first control circuit is based at least in part on the output of the second control circuit.

18 Claims, 7 Drawing Sheets

V{m2_gate}
*FIG. 3A*

DC TO DC CONVERTER WITH SEQUENTIALLY SWITCHED LC SNUBBER AND REGENERATIVE CIRCUIT

CROSS-REFERENCE TO RELATED APPLICATIONS

This application claims the benefit of Indian Application No. 201911015926 filed Apr. 22, 2019, which is incorporated herein by reference in its entirety.

BACKGROUND

The present disclosure relates generally to active clamp circuits and, more particularly, to active clamp and LC snubber circuits for switched-mode power converters.

Switched mode DC to DC converter power supplies are widely used to convert power from a source, such as mains power, to DC power supply for electronic devices. Switched mode DC to DC converters generally flyback and forward converter topologies. In both instances, the DC to DC converter employs a transformer and a switching device to couple energy to a secondary output. The transformer provides isolation as well as the ability to adjust the output voltage. However, due to its operation, a may suffer losses due to leakage inductance and excessive overshoot.

A well-known method to reduce these losses and limit overshoot is add an active clamp circuit switched mode power supplies. However, some known active clamp circuits require an integrated circuit (IC) to drive the clamp circuits. Other known active clamp circuits are self-driven, but are active during the full secondary stroke and intended for transition mode (quasi resonant) only power converters, which make these clamp circuits less suitable for certain modes of operation (e.g., Discontinuous Conduction Mode (DCM) operation). Moreover, most clamps and snubber circuits shunt leakage induced energy to ground and as a result reduce efficiency.

Accordingly, it is desirable to provide a switched mode power supply that overcomes losses due to snubber circuits and improves efficiency, particularly for power sensitive applications.

SUMMARY

According to one embodiment described herein is a switched mode power supply (SMPS) having a DC bus supplied by an power input, a first transformer with a first primary connected to the DC bus, and a second transformer with a second primary connected in series with the first primary, a first switching device connected in parallel with the second primary, a second switching device connected in series between the first switching device and a circuit ground. The SMPS also includes a snubber and hold up circuit having a diode and a holdup capacitor connected in parallel with the second switching device. The SMPS also includes a first control circuit connected to the first switching device and a second control circuit connected to the second switching device, wherein the output of the first control circuit is based at least in part on the output of the second control circuit.

In addition to one or more of the features described above, or as an alternative, further embodiments of the system may include that a diode having an anode and a cathode, and a capacitor having a first terminal and a second terminal, the first terminal operably connected to the cathode of the diode and a first DC load, the second terminal operably connected to a secondary circuit ground. The first terminal of the secondary winding of the first transformer is connected to the anode of the diode that rectifies the voltage and current supplied by the first transformer to supply voltage and current to the first DC load, and the second terminal of the secondary winding of the first transformer is connected to the secondary circuit ground and the capacitor provides at least one of voltage filtering, voltage stability, ripple reduction and improved hold up time for the voltage or current supplied to the first DC load.

In addition to one or more of the features described above, or as an alternative, further embodiments of the system may include a second diode having an anode and a cathode, and a second capacitor having a first terminal and a second terminal, the first terminal operably connected to a at least one of cathode of the diode and a second terminal of an inductor as well as a second DC load, the second terminal connected to another secondary circuit ground. The first terminal of the secondary winding of the first transformer is connected to the anode of the diode that rectifies the voltage and current supplied by the first transformer to supply voltage and current to the second DC load, and the second terminal of the secondary winding of the first transformer is connected to a secondary circuit ground, the second capacitor provides at least one of voltage filtering, voltage stability, ripple reduction and improved hold up time for the voltage or current supplied to the second DC load.

In addition to one or more of the features described above, or as an alternative, further embodiments of the system may include that the inductor has a first terminal and the second terminal, the first terminal of the inductor operably connected to the cathode of the second diode and the second terminal of the inductor is connected to the first terminal of the second capacitor, and a third diode having an anode and a cathode, the anode connected to the secondary circuit ground, and the cathode connected to the cathode of the second diode.

In addition to one or more of the features described above, or as an alternative, further embodiments of the system may include that the first switching device is operable when the second switching device is inactive.

In addition to one or more of the features described above, or as an alternative, further embodiments of the system may include that at least one of the first switching device and the second switching device is a metal-oxide-semiconductor field-effect transistor (MOSFET).

In addition to one or more of the features described above, or as an alternative, further embodiments of the system may include that at least the first switching device includes a diode having an anode and a cathode, where the anode is connected to the second terminal of the first switching device and the cathode is connected to the first terminal of the first switching device, wherein the diode is operable to circulate leakage currents from the primary winding of the second transformer under selected condition.

In addition to one or more of the features described above, or as an alternative, further embodiments of the system may include that the first control circuit includes a delay on the a signal provided by the second control circuit.

In addition to one or more of the features described above, or as an alternative, further embodiments of the system may include that the a snubber and hold up circuit captures leakage energy from at least one of the primary winding of the first transformer and the primary winding of the second transformer.

In addition to one or more of the features described above, or as an alternative, further embodiments of the system may include that energy captured in the snubber and holdup circuit is at least one of dissipated, employed to power an auxiliary circuit, employed to power at least in part the DC bus.

Also described herein in another exemplary embodiment is a method of sequentially switching a switched mode power supply (SMPS) to capture energy with a snubber and holdup circuit, the SMPS having a DC bus supplied power relative to a circuit ground. The method includes connecting a primary winding having a first terminal and a second terminal of a first transformer to the DC bus connecting a primary winding having a first terminal and a second terminal of a second transformer in series with the primary winding of the first transformer, and connecting a first switching device having a first terminal, a second terminal and a control terminal, in paralle 1 with the primary winding of the second transformer. The method also includes connecting a second switching device having a first terminal, a second terminal and a control terminal, in series between the first switching and the circuit ground and connecting a snubber and hold up circuit in parallel with the second switching device, the snubber and hold up circuit having a diode and a holdup capacitor connected in series. Furthermore, the method also includes controlling the first switching device with a first control circuit operably connected to the control input of the first switching device and controlling the second switching device with a second control circuit connected to the control input of the second switching device, wherein an output of the second control circuit is operably connected to the first control circuit and the output of the first control circuit is based at least in part on the output of the second control circuit.

In addition to one or more of the features described above, or as an alternative, further embodiments of the method of sequentially switching a switched mode power supply (SMPS) to capture energy with a snubber circuit may include connecting a secondary winding having a first terminal and a second terminal as an output of the SMPS, wherein the connecting includes connecting the secondary winding of the first transformer in at least one of a flyback topology and a forward converter topology. In addition, a capacitor provides at least one of voltage filtering, voltage stability, ripple reduction and improved hold up time for the voltage or current supplied to a first DC load.

In addition to one or more of the features described above, or as an alternative, further embodiments of the method of sequentially switching a switched mode power supply (SMPS) to capture energy with a snubber circuit may include connecting a secondary winding connected to as output of the SMPS, wherein the connecting includes connecting the secondary winding of the first transformer in at least one of a flyback topology and a forward converter topology. In addition, a second capacitor provides at least one of voltage filtering, voltage stability, ripple reduction and improved hold up time for the voltage or current supplied to a second DC load.

In addition to one or more of the features described above, or as an alternative, further embodiments of the method of sequentially switching a switched mode power supply (SMPS) to capture energy with a snubber circuit may include connecting an inductor having a first terminal and the second terminal, to the cathode of the second diode and the second terminal of the inductor is connected to a first terminal of the second capacitor; and a third diode having an anode and a cathode, the anode connected to the secondary circuit ground, and the cathode connected to the cathode of the second diode.

In addition to one or more of the features described above, or as an alternative, further embodiments of the method of sequentially switching a switched mode power supply (SMPS) to capture energy with a snubber circuit may include activating the first switching device when the second switching device is inactive.

In addition to one or more of the features described above, or as an alternative, further embodiments of the method of sequentially switching a switched mode power supply (SMPS) to capture energy with a snubber circuit may include that at least one of the first switching device and the second switching device is a metal-oxide-semiconductor field-effect transistor (MOSFET).

In addition to one or more of the features described above, or as an alternative, further embodiments of the method of sequentially switching a switched mode power supply (SMPS) to capture energy with a snubber circuit may include circulating leakage currents from the primary winding of the second transformer under selected condition, wherein the circulating is accomplished by connecting a diode having an anode and a cathode to the first switching device, wherein the anode of the diode is connected to the second terminal of the first switching device and the cathode of the diode is connected to the first terminal of the first switching device.

Including in addition to one or more of the features described above, or as an alternative, further embodiments of the method of sequentially switching a switched mode power supply (SMPS) to capture energy with a snubber circuit may include delaying the a signal provided by the second control circuit to the first control circuit.

In addition to one or more of the features described above, or as an alternative, further embodiments of the method of sequentially switching a switched mode power supply (SMPS) to capture energy with a snubber circuit may include capturing leakage energy with the a snubber and hold up circuit from at least one of the primary winding of the first transformer and the primary winding of the second transformer.

In addition to one or more of the features described above, or as an alternative, further embodiments of the method of sequentially switching a switched mode power supply (SMPS) to capture energy with a snubber circuit may include at least one of dissipating energy captured in the snubber and holdup circuit, powering an auxiliary circuit with energy captured in the snubber and holdup circuit, and powering, at least in part the DC bus with energy captured in the snubber and holdup circuit.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings, in which:

DETAILED DESCRIPTION

For the purposes of promoting an understanding of the principles of the present disclosure, reference will now be made to the embodiments illustrated in the drawings, and specific language will be used to describe the same. It should nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and/or a direct "connection".

In general, embodiments herein relate to an application of a dc-dc converter technique that overcomes the losses incurred as a result of the snubber circuit and reduces power loss in power sensitive or higher efficiency applications such as in an airborne environment.

The described embodiments are explained with respect to an example of flyback/forward DC-DC converters, which produces buck and boost topology output with a hold-up capacitor circuit. Further, the various embodiments may readily be applied to AC to DC converters in switched mode applications. It should be appreciated that the described embodiments are directed by way of example to various converters with sequenced gate pulse controlled circuit that works in a regenerative action during the off cycle time of the switching devices. Two independent switching frequencies can be deployed in sequential manner to provide two output voltages in step-down and step-up modes.

Figure 1:
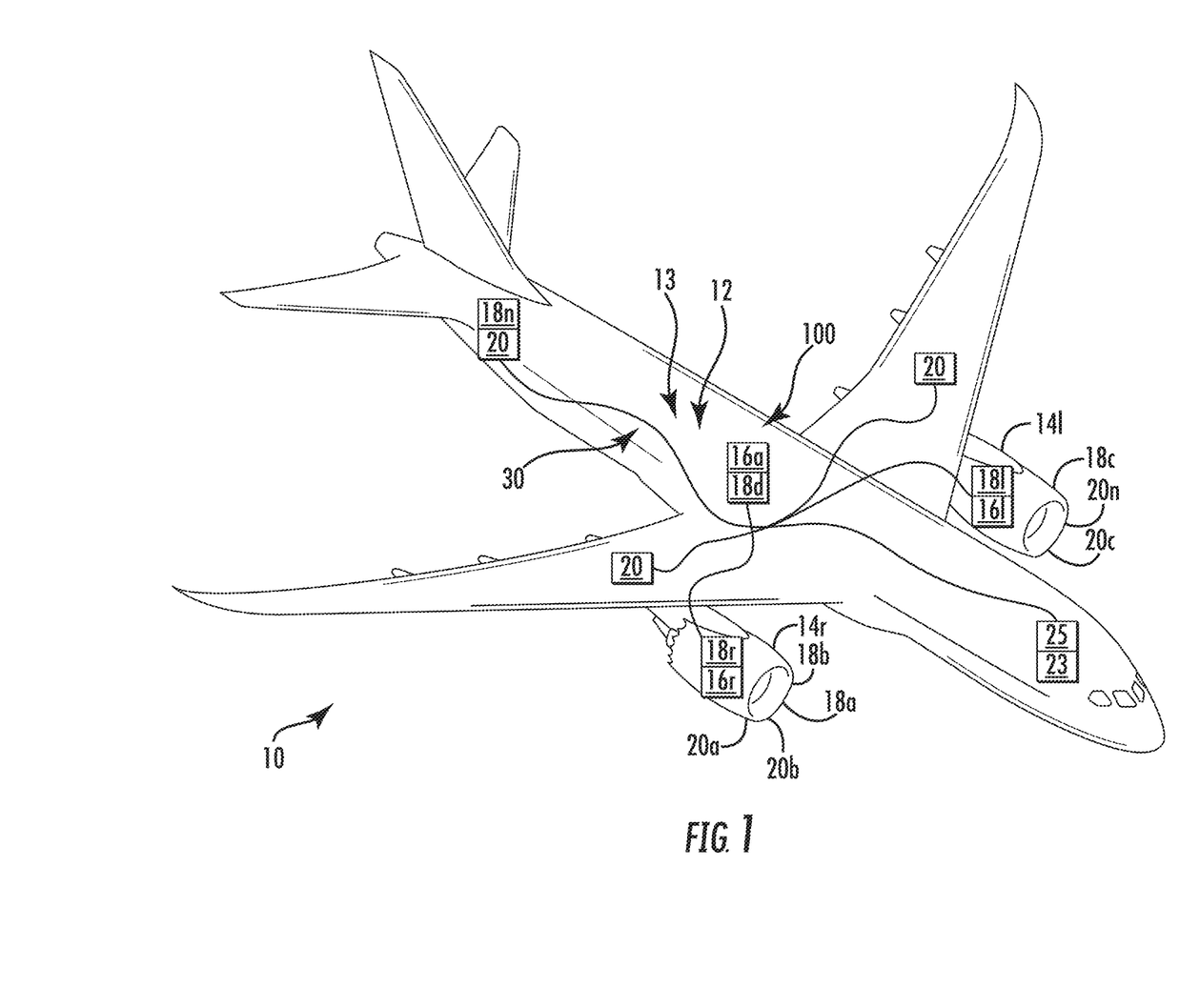
FIG. 1 depicts an example of an aircraft with controller and electrical power systems in accordance with an exemplary embodiment.

Referring to FIG. 1, an aircraft 10 is shown. Aircraft 10 includes one or more control systems shown generally as 12. The control system 12 may include a power system 13 that interconnects with one or more controllers referred to generally as 16 and more specifically as 16*l*, 16*r* commonly located at or near each engine 14*l*, 14*r*. Other controllers 16 are also be depicted in this instance as 16*a*, 16*b*, and the like. In the described embodiments, the reference numerals are annotated with an "l" or "r" to denote the left or right side of the aircraft 10, respectively, for the purpose of simplicity of description. Likewise, the annotation "a", "b", "n" is employed to simplify designation of a multiple enumeration of a component or element.

Each of the controllers 16 may be configured to receive various sensor signals from sensors referred to generally as 18 and individually as 18*a*, 18*b*, . . . 18*n* all over the aircraft 10 and may also operate one or more actuators shown generally as 20, and more specifically as 20*a*, 20*b*, 20*c*, . . . 20*n* to control the operation of the engines 14*r*, 14*l*, flight controls, (not shown), power systems 13 and the like. The control system 12 and power system 13 may also be operably connected to various other components throughout the aircraft 10, including, but not limited to other controllers 16, control panels 23, displays 25, and the like. Some controllers 16 e.g., 16*a* may also be configured to receive power from various aircraft sources, e.g., generators, batteries and the like and distribute power as needed to various systems in the aircraft 10 The power system 13 may be part of a controller 16. In yet another embodiment, the configuration could be the opposite with the controller 16 operating as or providing a portion of the power system 13, as illustrated by the general depiction of 16*a* and described further herein. In an embodiment, the power system 13 includes a power supply or converter 100 hereinafter referred to as a power supply 100 as described herein for receiving power from a bus system, converting and routing power to various components in the aircraft 10. In an embodiment, a power supply 100 may be a single or three-phase AC to DC converter, or it could be a DC to DC converter 100. In one embodiment, and as describes by way of example herein, the power supply 100 is a DC to DC converter.

Figure 2:
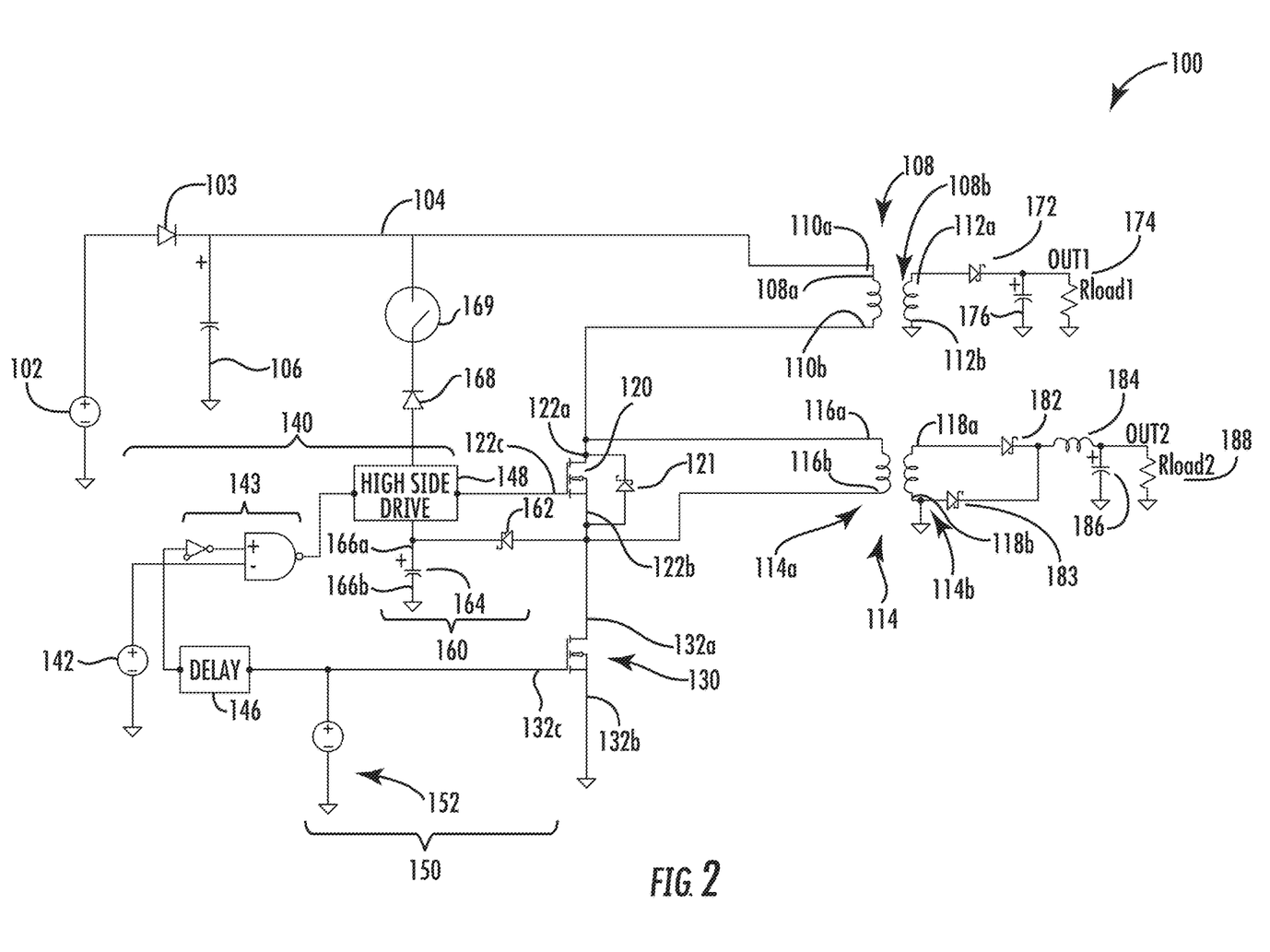
FIG. 2 depicts a simplified schematic diagram of an embodiment of a power supply with sequentially switched LC snubber and regenerative circuit in accordance with an embodiment.

FIG. 2 depicts an embodiment of power supply 100 in a flyback and forward converters DC to DC configuration. The topology of the power supply facilitates producing buck and boost DC outputs as well as a hold-up capacitor circuit that recaptures leakage currents with the potential to individually supply other components or for further efficiency. The described embodiments employ a sequenced gate pulse controlled circuit that works in regenerative action at toff cycle. Two independent switching frequencies can be deployed in sequential manner to provide two output voltages in step-down and step-up modes.

The power supply 20 receives input power from a power source 102 and a DC bus 104 supported by a filter capacitor 106. The power supply 20 employs at least a first transformer 108 denoted as T1 having a primary winding 108*a* and a secondary winding 108*b*. The primary winding 108*a* has a first terminal 110*a* and a second terminal 110*b*. Likewise, the secondary winding 108*b* has a first terminal 112*a* and a second terminal 112*b*. The first terminal 110*a* of the primary winding 108*a* is connected to the DC bus 104. In series with the primary winding 108*a* is the primary winding 114*a* of a second transformer 114 that also has a secondary winding 114b. The primary winding 114a has a first terminal 116a and a second terminal 116b. Likewise, the secondary winding 114b has a first terminal 118a and a second terminal 118b. The second terminal 110b of the primary winding 108a is connected to the first terminal 116a of the primary winding 114a of the second transformer 114. Connected in parallel with the primary winding 114a of the second transformer 114 is a first switching device 120. A first terminal 122a of the first switching device 120 is connected to the first terminal 116a of the primary winding 114a of the second transformer and a second terminal 122b connected to the second terminal 116b of the primary winding 114a of the second transformer 114. Also connected in parallel with the primary winding 114a of the second transformer 114 and the first switching device 120 is a clamping diode 124 having a cathode connected to the first terminal 122a of the first switching device 120 and an anode connected to the second terminal 122b of the first switching device 120.

Connected in series with the primary winding 114a of the second transformer 114 and the first switching device 120 is a second switching device 130. A first terminal 132a of the second switching device 130 is connected to the second terminal 114b of the primary winding 114a of the second transformer (as well as the second terminal 122b of the first switching device 122) and a second terminal 132b connected to ground. In an embodiment the first switching device 122 and the second switching device 132 are MOSFETS, however other kinds of semiconductor switches are possible including transistors, BJT, IGBT, FETS, and the like. A third terminal 122c is connected to a first control circuit 140, and a third terminal 132c of the second switching device is connected to a second control circuit 150. The power supply 20 also includes a snubber and hold up circuit 160 also referred to as snubber 160. The snubber 160 includes a series connected diode 162 and a holdup capacitor 164. The diode 162 has its anode connected to connection of the second terminal 122b of the first switching device and the first terminal 132a of the second switching device 130. The cathode of the diode 162 is connected to a first terminal 166a of the capacitor 164. A second terminal 166b of the capacitor 164 is connected to ground.

Continuing with FIG. 2 and completing the description of the power supply 20, the secondary winding 108b of the first transformer 108 has a first terminal 112a is connected through diode in a flyback configuration. That is, the first terminal 112a of the secondary winding 108b is connected to the anode of a diode that rectifies the voltage and current supplied by the first transformer 108 to supply a first DC load 174. A capacitor 176 is employed to provide voltage stability, ripple reduction and improved hold up time. The second terminal 112b of the secondary winding 108b is connected to ground. Similarly, the secondary winding 114b of the second transformer 114 has a first terminal 118a connected through diode in a forward converter configuration. That is, in this embodiment the first terminal 118a of the secondary winding 114b is connected to the anode of diode 182, which then supplies via its cathode an LC filter based on inductor 184 and capacitor 186 to feed a second load 188. In addition, the second terminal 118b of the secondary winding 114b is connected to ground and to the anode of another diode 183, which in turn has its cathode connected to the cathode of diode 182 and the inductor 184. While the described embodiments are illustrated by way of example with reference to the secondaries of the power supply 20 being configured as a flyback and forward converter topologies, (first transformer 108 T1 is configured in to work in flyback mode and second transformer T2 114 as forward converter), other topologies, and combinations of topologies are possible. It should be appreciated that The flyback and forward converter topology, such as shown in FIG. 1, may readily be employed in low power applications facilitated its simple structure and employing fewer components. However, such a simple structure however, means that power supplies may suffer from larger voltage/current stresses induced on the switching devices of such a topology. Moreover, leakage inductance of the transformer e.g., first transformer T1 108 can cause large voltage spikes at turn-off of the first switching device 120. Under some operating conditions the voltage spike might exceed the specified breakdown voltage of the switching device 120 and degrade or damage the switching device. To avoid such harmful voltage spikes, in an embodiment, a voltage snubber and proper regenerative circuit is employed to capture and recover the dissipated energy of the transients.

Figure 3A:
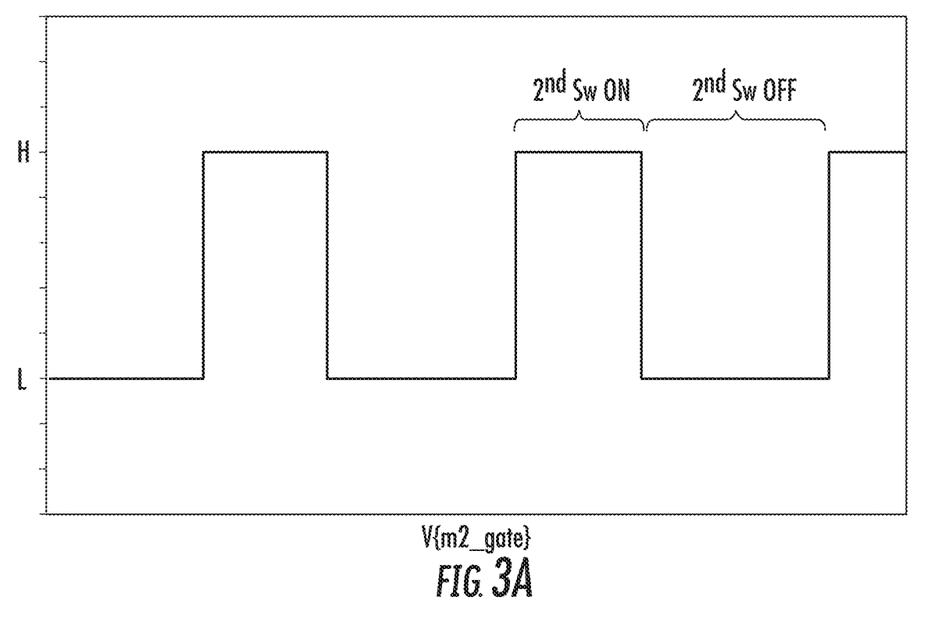
FIG. 3A depicts a simplified timing diagram of the switching devices of the power supply in accordance with an embodiment.
Figure 3B:
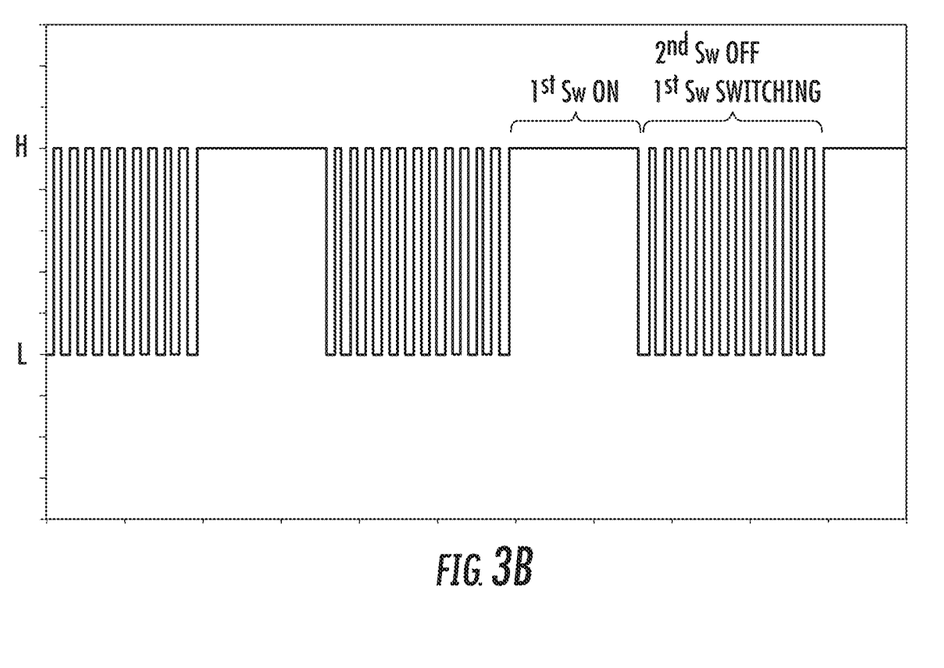
FIG. 3B depicts a simplified timing diagram of the switching devices of the power supply in accordance with an embodiment.

Turning now to FIGS. 3A and 3B as well, in operation, two control circuits 140 and 150 are used to operate the first switching device 120 and the second switching device 130 respectively. In an embodiment two pulse train generators 152 and 142 initiate generating control signals for the first switching device 120 and second switching device 130. FIG. 3A depicts the control signal for the second switching device 130 where H indicates that the second switching device is on. FIG. 3B depicts the condition where the first switching device 120 is on or off and the switching of the second switching device 130. In an embodiment, the second pulse generator 142 operates at a frequency is selected to be greater than or equal to at least twice the frequency of the first pulse generator 152 frequency. In this manner, a complete period (TON+TOFF) of second pulse can fit in the Toff time first pulse train from the first pulse generator. For example, if the first pulse frequency from the first pulse generator 152 is selected to be 50 kHz., then second pulse frequency from the second pulse generator is selected to be 100 KHz. or higher. In an embodiment, the first pulse train generator 152 and thereby the second switching device 130 operates at a frequency of 50 KHz., while the second pulse train generator 142 and thereby the first switching device 120 operates at a frequency of at least 100 KHz. A comparison logic function 143 (e.g., a comparator and NAND gate) constitutes and formulates sequenced switching of the first switching device 120. During switching transitions, e.g., first switching device 120 active and the second switching device 130 inactive (off), a delay block 146 retains the first switching device 120 in an active (ON) (or delays activation of the first switching device slightly) state briefly (e.g. for few microseconds) depending on L1 leakage inductance. Delay block 146 is used to reduce voltage overshoot due to the inductance of the primary winding 108a of the first transformer 108 while the second switching device 130 is turning off. It should be appreciated that while described in this example, the delay block is optional. In operation, when both switching devices 120, 130 are on, the primary winding 108a of the first transformer passes current and is energized. When the second switching device 130 is off, when the first switching device turns off the current is the primary winding 108a is interrupted, causing a voltage overshoot and ringing as the inductance opposes the change in current developing a voltage spike. The delay block, in delaying the turn of the first switching device 120 due to energy transfer to the secondary winding 108b. The leakage energy from first transformer (T1) 108 will provide high peaking during the period the second switching device 130 is off, and as a result current will forward bias the diode 162 charging the hold-up capacitor 164 with instantaneous energy (rather than passing through the primary winding 114a of the second transformer 114. In an embodiment, if desired, a low value resistor can also be employed in series with the diode 162 to limit the current flow in the diode 162 and/or hold-up capacitor 164. In an embodiment, the switching frequency of the second switching device 130 is retained lesser than the switching frequency for the first switching device 120. Therefore the first switching device 120 is operated during the off cycle time of the second switching device, which ensures no false triggering of the first switching device 120 during ton period of the second switching device 130.

Figure 4A:
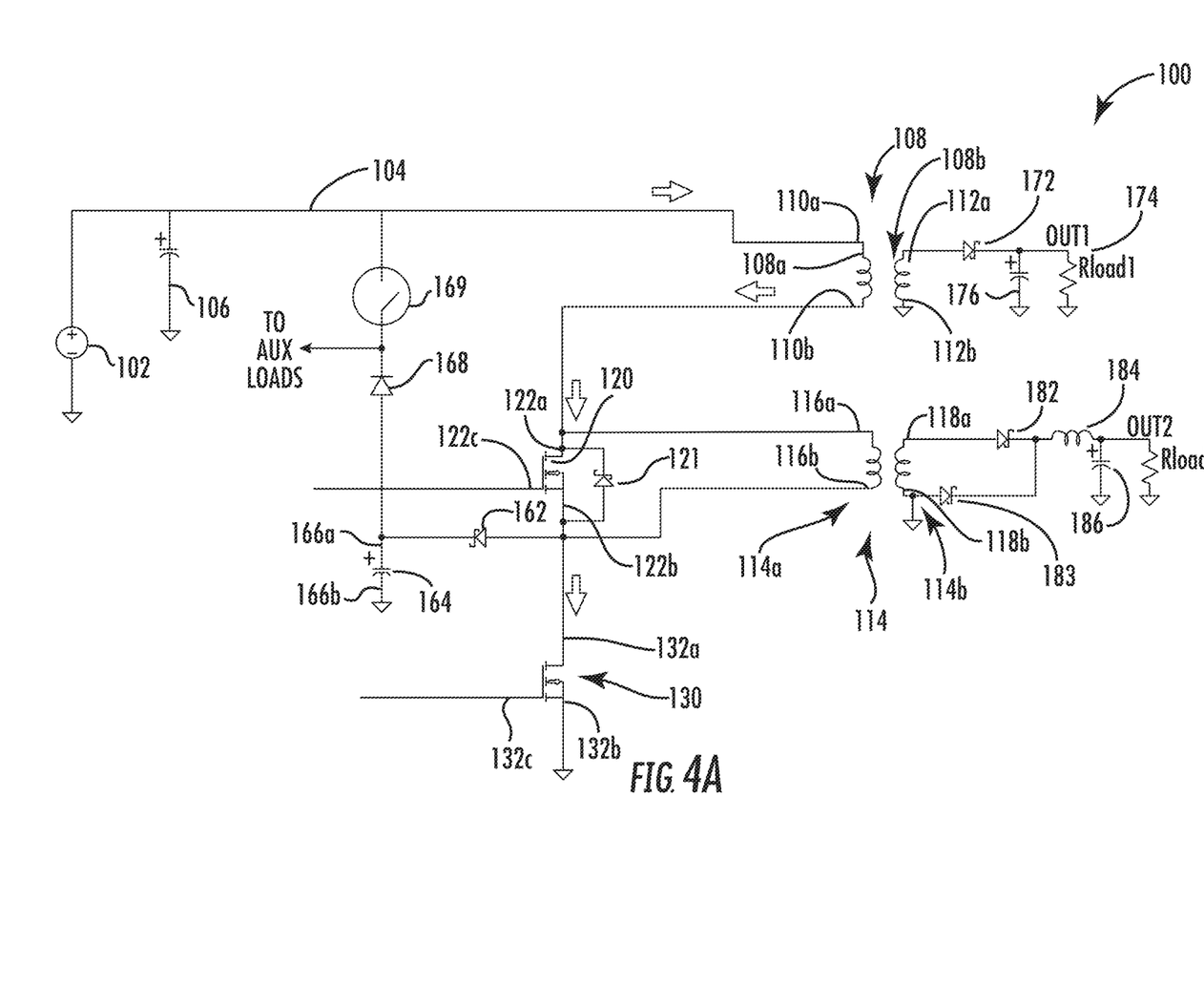
FIG. 4A depicts a simplified schematic diagram showing a current path through an embodiment of a power supply in accordance with an embodiment.
Figure 4B:
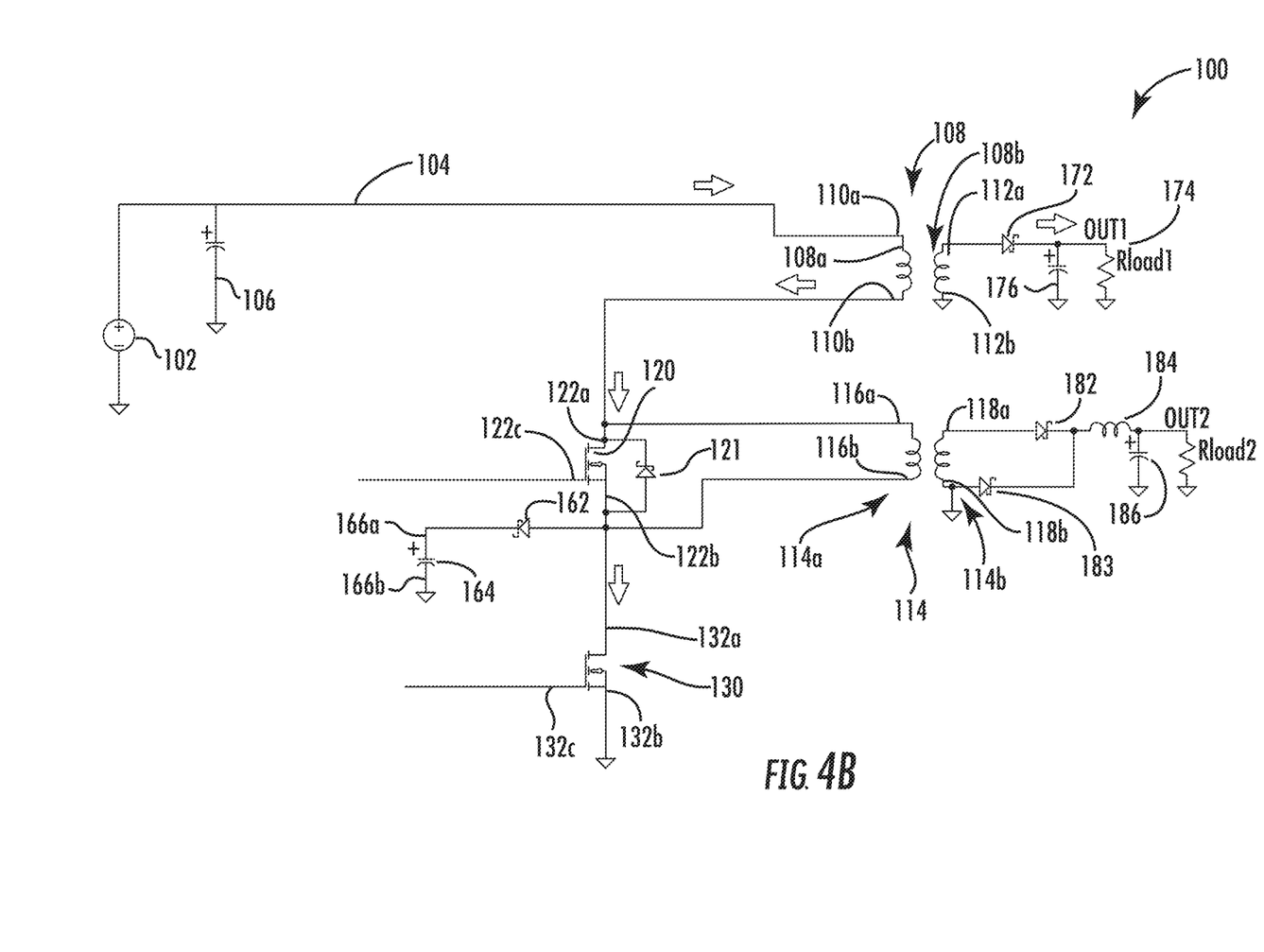
FIG. 4B depicts a simplified schematic diagram showing a current path through an embodiment of a power supply in accordance with an embodiment.
Figure 4C:
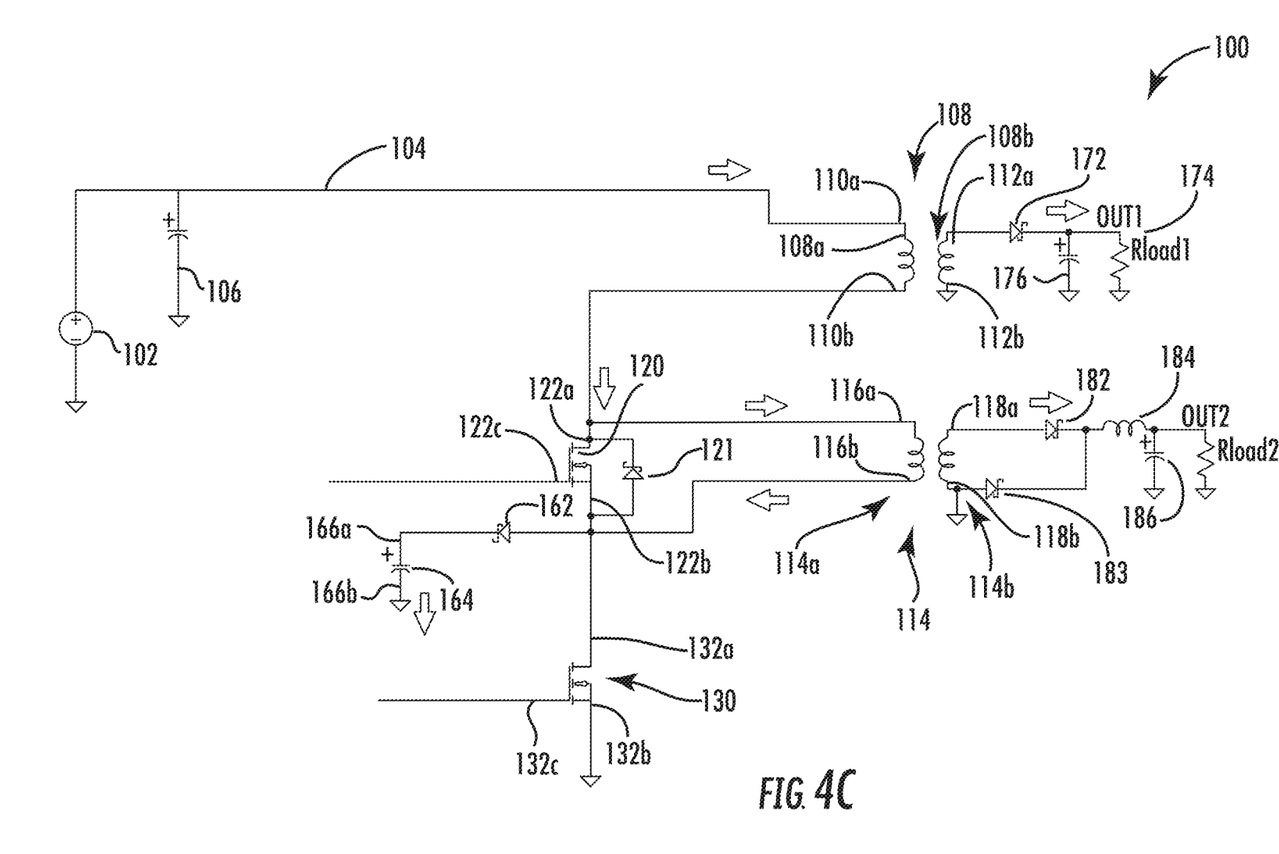
FIG. 4C depicts a simplified schematic diagram showing a current path through an embodiment of a power supply in accordance with an embodiment.

FIGS. 4A-4C depicts the power supply 100 and the current paths associated with it in operation. Initially, as depicted in FIG. 4A, the first switching device 120 and the second switching device 130, is turned on and the supply voltage Vin from the DC bus 104 is applied to the primary winding 108a of the first transformer 108. The magnetizing current will flow through primary winding 108a of the first transformer (T1) 108 and connects to ground through the first switching device 120 and then second switching device 130.

FIG. 4B depicts the next step in the operation of the power supply 100 including choice of or alternate operation of switching to operate in either full capacitive snubber or LC snubber action during the toff time of the second switching device 130. In the first instance, the second switching device 130 is turned OFF, while maintaining the first switching device 120 ON. Under these conditions, magnetizing current will flow through primary winding 108a of the first transformer T1 108 and through the first switching device 120. In that the second switching device 130 is no longer conducting, the current forward biases the diode 162 charging the capacitor 164. In an embodiment, the hold-up capacitor 164 is chosen to be higher value required to store sufficient energy as needed and permit sufficient current to flow through the primary winding 108 of the first transformer 108 and to power-up auxiliary or critical circuits that are required to meet selected hold up time requirements where equipment is expected to operate during power input drop outs for a selected duration. This power interruption duration can range from 5 ms. all the way to 1000 ms. for the DO-160 or MIL-STD-704 standards. Simultaneously, through induction principle a current will also flow through the secondary winding 108b of the first transformer 108 and through diode 172 charging the capacitor 176 to power the load 174.

Alternatively, as depicted in FIG. 4C, while the second switching device 130 is turned off, first switching device 120 is switching. Under this instance, the magnetizing current will flow through the primary winding 108a of the first transformer 108. In addition, once again, through induction a current will flow through the secondary winding 108b of the first transformer T1 108 and the current will flow through diode 172 being rectified and charging capacitor 176 as well as supplying the load 174. In addition, in as a result of the switching of the first switching device 120, during its off cycle, current is directed through the primary winding 114a of the second transformer 114. As the second switching device 130 is no longer conducting, the snubber diode 162 starts to conduct during first switching device 120 switching period and magnetizing current (from primary winding 108a of the first transformer 108 and the primary winding 114a of the second transformer 114) charges the hold-up capacitor 164. This method of operation will improve harvesting leakage energy due to leakage inductance of the first transformer 108. Moreover, leakage energy from the second transformer 114 will also circulate within first switching device 120 and primary winding 114a of the second transformer 114 through body diode 121 of the first switching device 120 which operates to maintain induction in the second transformer 114. The second transformer primary winding 114a will become active and store the magnetic energy in following path circulating currents through the primary winding 108a of the first transformer through the primary winding 114a of the second transformer, diode 162 and holdup capacitor 164. Simultaneously, a current will flow through the secondary winding 114b of the second transformer T2 114 and this current will also be rectified by diode 182, flowing through filter inductor 184 and charging capacitor 186 as well as supplying the load 188.

The holdup capacitor 164 exhibits a peak voltage that can readily be calculated as:

$$V_{Holdop\text{-}peak} = V_{in} + V_{T1primary} - V_{T2primary} + n1*V_{out1} - n2*V_{out2} - V_{diode\ drop}$$

Where: $V_{T1primary}$, $V_{T2primary}$ are the primary voltage due to primary winding inductances during the first switching device off time for the first transformer 108 and the second transformer 114 respectively, Vout1 and Vout2 are the output voltages of the power supply 100; n1 and n2 is the transformation ratios of the first transformer 108 and the second transformer 114 respectively.

It should be noted that $V_{T2primary}$ and $n2*V_{out2}$ will come in action during first switching device 120 off period only. In an embodiment the energy stored in the holdup capacitor may be employed in the primary side of the power supply circuit as an auxiliary power source. In one embodiment, the energy stored in the holdup capacitor is employed to power critical loads or other auxiliary circuits. In another embodiment, the energy stored in the holdup capacitor is employed to power the control logic for the power supply and generate the control functions 140 and 150. In yet another embodiment a diode or switching device may be employed to transmit the energy from the holdup capacitor to the DC bus 104 for reuse. These approaches all provide for capturing a recycling energy typically dissipated and thereby enhancing the efficiency of the power supply 100. FIG. 2 depicts in one instance the hold-up capacitor is connected to input DC bus 104 of same power supply with diode 168 and control switch 169 activated when there is any power interrupt or holdup capacitor 164 is fully charged (capacitor voltage sensing circuits are not shown as part of this disclosure). Diode 103 protects the incoming power supply from reverse bias during holdup capacitor operation. In addition, in another possible alternative arrangement, the hold-up capacitor 164 is connected to downstream loads or converters with diode 168. Downstream converters may be employed will provide supply to critical circuits to operate on transparency/hold up time as described herein.

Figure 5:
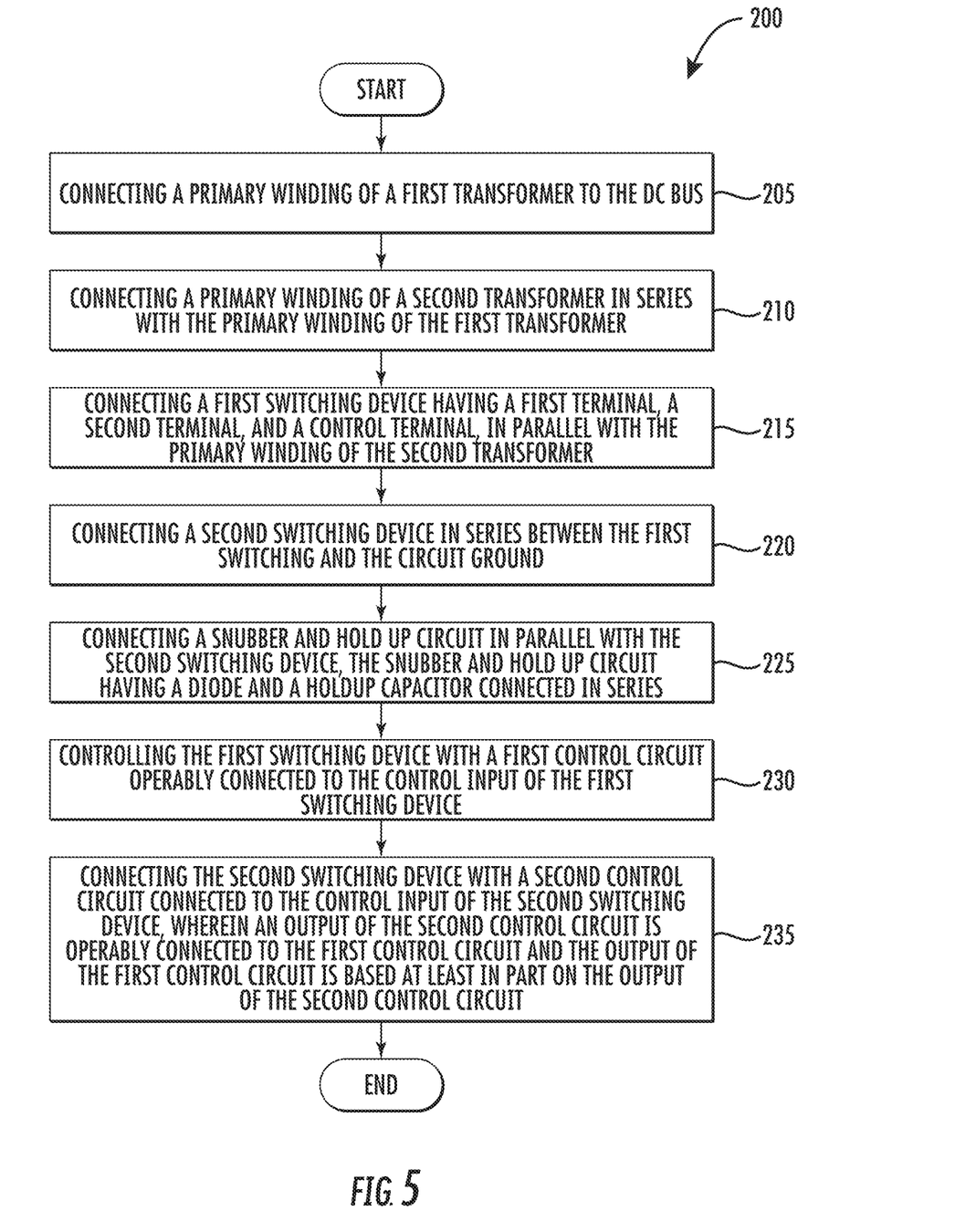
FIG. 5 depicts a simplified flowchart of the method of sequentially switching a switched mode power supply (SMPS) to capture energy with a snubber and holdup circuit in accordance with an embodiment.

Turning now to FIG. 5 for a description of the method 200 of sequentially switching a switched mode power supply (SMPS) to capture energy with a snubber circuit in accordance with an embodiment, the SMPS having a DC bus supplied power relative to a circuit ground. The method 200 initiates a process block 205 with connecting a primary winding having a first terminal and a second terminal of a first transformer to the DC bus. At process block 210 a primary winding having a first terminal and a second terminal of a second transformer is connected in series with the primary winding of the first transformer. The method 200 continues at process block 215 and connecting a first switching device having a first terminal, a second terminal and a control terminal, in parallel with the primary winding of the second transformer. Further a second switching device having a first terminal, a second terminal and a control terminal is connected in series between the first switching and the circuit ground as depicted at process block 220. At process block 225 a snubber and hold up circuit is connected in parallel with the second switching device, the snubber and hold up circuit having a diode and a holdup capacitor connected in series. The method 200 continues at process block 230 with controlling the first switching device with a first control circuit operably connected to the control input of the first switching device. Finally at process block 235, the method 200 includes controlling the second switching device with a second control circuit connected to the control input of the second switching device, wherein an output of the second control circuit is operably connected to the first control circuit and the output of the first control circuit is based at least in part on the output of the second control circuit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, element components, and/or groups thereof. For the purposes of this disclosure, it is further understood that the terms "inboard" and "outboard" can be used interchangeably, unless context dictates otherwise.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A switched mode power supply (SMPS) comprising:
   a DC bus supplied by a power input relative to a circuit ground;
   a first transformer with a primary winding having a first terminal and a second terminal, and a secondary winding having a first terminal and a second terminal, the first terminal of the primary winding being connected to the DC bus the first terminal of the secondary winding connected to an output;
   a second transformer with a primary winding having a first terminal and a second terminal, and a secondary winding having a first terminal and a second terminal, the first terminal of the primary winding of the second transformer connected to the second terminal of the primary winding of the first transformer and the first terminal of the secondary winding connected to the output;
   a first switching device having a first terminal, a second terminal and a control terminal, the first terminal of the first switching device connected to the first terminal of the primary winding of the second transformer and the second terminal of the first switching device connected to the second terminal of the primary winding of the second transformer;
   a second switching device having a first terminal, a second terminal and a control terminal, the first terminal of the second switching device connected to the second terminal of the primary winding of the second transformer and the second terminal of the second switching device connected to the circuit ground;
   a snubber and hold up circuit having a diode and a holdup capacitor connected in series, wherein an anode of the diode is connected to the second terminal of the primary winding of the second transformer and a cathode of the diode is connected to an input terminal of the holdup capacitor and a second terminal of the holdup capacitor is connected to the circuit ground;
   a first control circuit connected to the control terminal of the first switching device;
   a second control circuit connected to the control terminal of the second switching device, wherein an output of the second control circuit is operably connected to the first control circuit and an output of the first control circuit is based at least in part on the output of the second control circuit, wherein the first control circuit includes a delay on a signal provided by the second control circuit, wherein the first switching device and the second switching device are operated temporarily in a same state.

2. The SMPS of claim 1, further including a first diode having an anode and a cathode; and
   a capacitor having a first terminal and a second terminal, the first terminal of the capacitor operably connected to the cathode of the first diode and a first DC load, the second terminal of the capacitor operably connected to a secondary circuit ground; and
   wherein the first terminal of the secondary winding of the first transformer is connected to the anode of the first diode that rectifies a voltage and current supplied by the first transformer to supply voltage and current to the first DC load, and the second terminal of the secondary winding of the first transformer is connected to the secondary circuit ground;
   wherein the capacitor provides at least one of voltage filtering, voltage stability, ripple reduction and improved hold up time for the voltage or current supplied to the first DC load.

3. The SMPS of claim 1, further including a second diode having an anode and a cathode; and
   a second capacitor having a first terminal and a second terminal, the first terminal of the second capacitor operably connected to a at least one of cathode of the second diode and a second terminal of an inductor as well as a second DC load, the second terminal connected to a secondary circuit ground;
   wherein the first terminal of the secondary winding of the first transformer is connected to the anode of the diode that rectifies a voltage and current supplied by the first transformer to supply voltage and current to the second DC load, and the second terminal of the secondary winding of the first transformer is connected to a secondary circuit ground;
   wherein the second capacitor provides at least one of voltage filtering, voltage stability, ripple reduction and improved hold up time for the voltage or current supplied to the second DC load.

4. The SMPS of claim 3, further including the inductor having a first terminal and the second terminal, the first terminal of the inductor operably connected to the cathode of the second diode and the second terminal of the inductor is connected to the first terminal of the second capacitor; and
    a third diode having an anode and a cathode, the anode of the third diode connected to the secondary circuit ground, and the cathode of the third diode connected to the cathode of the second diode.

5. The SMPS of claim 1, wherein the first switching device is operable when the second switching device is inactive.

6. The SMPS of claim 1, wherein at least one of the first switching device and the second switching device is a metal-oxide-semiconductor field-effect transistor (MOSFET).

7. The SMPS of claim 1, wherein at least the first switching device includes a fourth diode having an anode and a cathode, where the anode of the fourth diode is connected to the second terminal of the first switching device and the cathode of the fourth diode is connected to the first terminal of the first switching device, wherein the fourth diode is operable to circulate leakage currents from the primary winding of the second transformer under a selected condition.

8. The SMPS of claim 1, wherein the snubber and hold up circuit captures leakage energy from at least one of the primary winding of the first transformer and the primary winding of the second transformer.

9. The SMPS of claim 1, wherein energy captured in the snubber and holdup circuit is at least one of dissipated, employed to power an auxiliary circuit, employed to power at least in part the DC bus.

10. A method of sequentially switching a switched mode power supply (SMPS) to capture energy with a snubber and holdup circuit, the SMPS having a DC bus supplied power relative to a circuit ground, the method comprising:
    connecting a primary winding having a first terminal and a second terminal of a first transformer to the DC bus;
    connecting a primary winding having a first terminal and a second terminal of a second transformer in series with the primary winding of the first transformer;
    connecting a first switching device having a first terminal, a second terminal and a control terminal, in parallel with the primary winding of the second transformer;
    connecting a second switching device having a first terminal, a second terminal and a control terminal, in series between the first switching and the circuit ground;
    connecting the snubber and hold up circuit in parallel with the second switching device, the snubber and hold up circuit having a diode and a holdup capacitor connected in series;
    controlling the first switching device with a first control circuit operably connected to the control terminal of the first switching device;
    controlling the second switching device with a second control circuit connected to the control terminal of the second switching device, wherein an output of the second control circuit is operably connected to the first control circuit and an output of the first control circuit is based at least in part on the output of the second control circuit; and
    a delaying a signal provided by the second control circuit to the first control circuit, wherein the first switching device and the second switching device are operated temporarily in a same state.

11. The method of sequentially switching the switched mode power supply (SNIPS) to capture energy with the snubber and holdup circuit of claim 10, further including connecting a secondary winding of the first transformer having a first terminal and a second terminal as an output of the SMPS, wherein the connecting includes connecting the secondary winding of the first transformer in at least one of a flyback topology and a forward converter topology;
    wherein a capacitor provides at least one of voltage filtering, voltage stability, ripple reduction and improved hold up time for a voltage or current supplied to a first DC load.

12. The method of sequentially switching the switched mode power supply (SMPS) to capture energy with the snubber and holdup circuit of claim 10, further including connecting a secondary winding of the first transformer connected to an output of the SMPS, wherein the connecting includes connecting the secondary winding of the first transformer in at least one of a flyback topology and a forward converter topology; and
    wherein a second capacitor provides at least one of voltage filtering, voltage stability, ripple reduction and improved hold up time for a voltage or current supplied to a second DC load.

13. The method of sequentially switching the switched mode power supply (SMPS) to capture energy with the snubber and holdup circuit of claim 12, further including connecting a first terminal of an inductor to the cathode of the second diode and connecting a second terminal of the inductor to a first terminal of the second capacitor; and
    connecting an anode of a third diode to a secondary ground and connecting a cathode of the third diode to the cathode of the second diode.

14. The method of sequentially switching the switched mode power supply (SMPS) to capture energy with the snubber and holdup circuit of claim 10, further including activating the first switching device when the second switching device is inactive.

15. The method of sequentially switching the switched mode power supply (SMPS) to capture energy with the snubber and holdup circuit of claim 10, wherein at least one of the first switching device and the second switching device is a metal-oxide-semiconductor field-effect transistor (MOSFET).

16. The method of sequentially switching the switched mode power supply (SMPS) to capture energy with the snubber and holdup circuit of claim 10, further including circulating leakage currents from the primary winding of the second transformer under a selected condition, wherein the circulating is accomplished by connecting a first diode having an anode and a cathode to the first switching device, wherein the anode of the first diode is connected to the second terminal of the first switching device and the cathode of the first diode is connected to the first terminal of the first switching device.

17. The method of sequentially switching the switched mode power supply (SMPS) to capture energy with the snubber and holdup circuit of claim 10, capturing leakage energy with the snubber and hold up circuit from at least one of the primary winding of the first transformer and the primary winding of the second transformer.

18. The method of sequentially switching the switched mode power supply (SMPS) to capture energy with the snubber and holdup circuit of claim 10, further including at least one of dissipating energy captured in the snubber and holdup circuit, powering an auxiliary circuit with energy captured in the snubber and holdup circuit, and powering, at least in part the DC bus with energy captured in the snubber and holdup circuit.

* * * * *